United States Patent [19]

Tate

[11] Patent Number: 4,563,944
[45] Date of Patent: Jan. 14, 1986

[54] PRODUCT ORIENTING CONVEYOR

[75] Inventor: Warren L. Tate, Duncanville, Tex.

[73] Assignee: Frito-Lay, Inc., Dallas, Tex.

[21] Appl. No.: 626,030

[22] Filed: Jun. 29, 1984

[51] Int. Cl.$^4$ .............................................. A47J 37/12
[52] U.S. Cl. ...................................... 99/355; 99/407; 99/443 C; 198/803.14
[58] Field of Search ...................... 99/407, 443 C, 355; 426/523; 198/649, 652, 342

[56] References Cited

U.S. PATENT DOCUMENTS

| | | | |
|---|---|---|---|
| 1,935,783 | 11/1933 | Roemer | 198/649 X |
| 2,568,073 | 9/1951 | Koppel et al. | 198/649 |
| 3,070,216 | 12/1962 | Robson | 198/649 X |

Primary Examiner—Billy J. Wilhite
Attorney, Agent, or Firm—Bernard, Rothwell & Brown

[57] ABSTRACT

A conveyor for removing generally disc-shaped articles from a liquid and orienting the articles with their planes generally vertical includes an endless conveyor with a surface having a plurality of rods extending therefrom in a generally perpendicular orientation therewith. The rods are of at least two different lengths, and nearest adjacent rods are separated by a distance less than the average diameter of the articles. The rods are arranged on the surface in a pattern of varying heights wherein nearest adjacent rods are generally of different lengths.

15 Claims, 8 Drawing Figures

PRODUCT ORIENTING CONVEYOR

BACKGROUND OF THE INVENTION

1. Field of the Invention

The present invention relates to a conveyor for removing generally disc-shaped articles from a liquid and maintaining them vertically.

2. Description of the Background Art

The use of a conveyor belt to remove a product from a liquid is well known in the art. Such conveyors are generally partially submerged in the liquid, exiting the liquid at an angle with the product on the conveyor's outer surface. The outer surface of such conveyors are generally flat, and usually porous to permit drainage of fluid from the product being removed.

When disc-shaped food products, e.g., potato chips, are removed by a prior art conveyor from a liquid, e.g., frying oil, the planar surfaces of the chips are generally parallel with the surface of the conveyor. Although the porous structure of the conveyor permits some drainage of the fluid, the generally horizontal orientation of the product tends to restrict fluid drainage, presumably due to adherence of fluid on the surface of the product.

In the case of fried potato chips, adherence of surface oil to the chips may not be desirable since such oil may be absorbed by the chips and contribute to their final oil and caloric content.

Spiked conveyors are known in the art. For example, expired U.S. Pat. No. 1,935,783 discloses an apparatus for conveying steel sheets and the like through a liquid bath, e.g., during a pickling operation. Another spiked conveyor is shown in expired U.S. Pat. No. 2,568,073. This apparatus is adapted to support and convey metal discs on edge through a furnace structure.

There remains, however, a need in the art for a conveyor for removing generally disc-shaped articles from a liquid and orienting the articles with their planes generally vertical.

SUMMARY OF THE INVENTION

In accordance with the present invention, a conveyor for removing generally disc-shaped articles from a liquid and orienting the articles generally vertically comprises an endless conveyor belt having an outer surface which includes means for orienting the product on edge, the means comprising a plurality of rods extending from the outer surface in a generally perpendicular orientation with the outer surface, and a pattern of varying heights.

DETAILED DESCRIPTION OF THE PREFERRED EMBODIMENT

The present invention provides a conveyor for removing generally disc-shaped articles from a liquid and orienting the articles with their planes generally vertical. The invention is particularly useful for removing fried vegetable slices, e.g., potato chips, from cooking oil and orienting them vertically to facilitate oil drainage.

Figure 3:
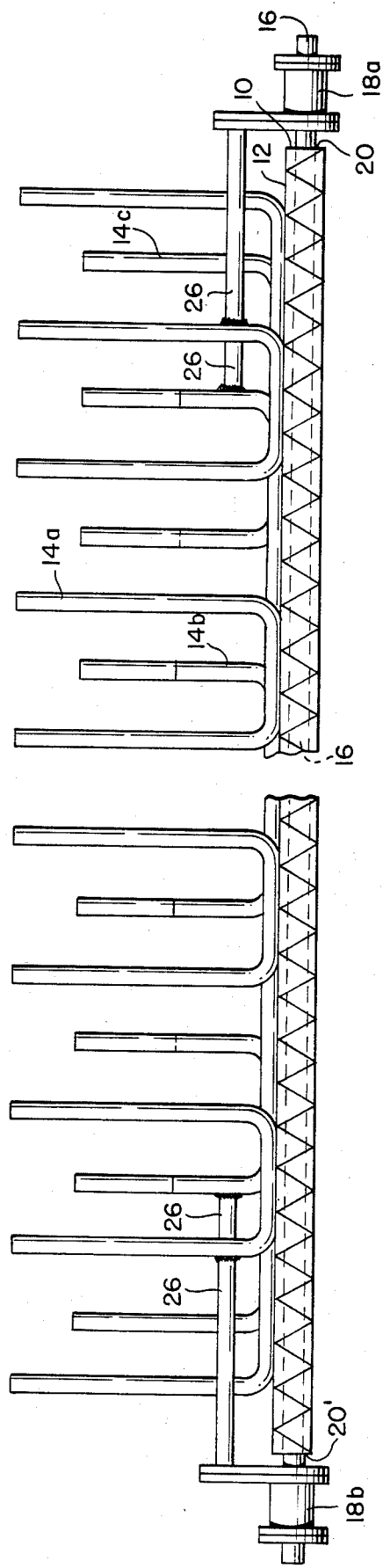
FIG. 3 is a front elevation view of the conveyor with the center portion broken away.
Figure 1:
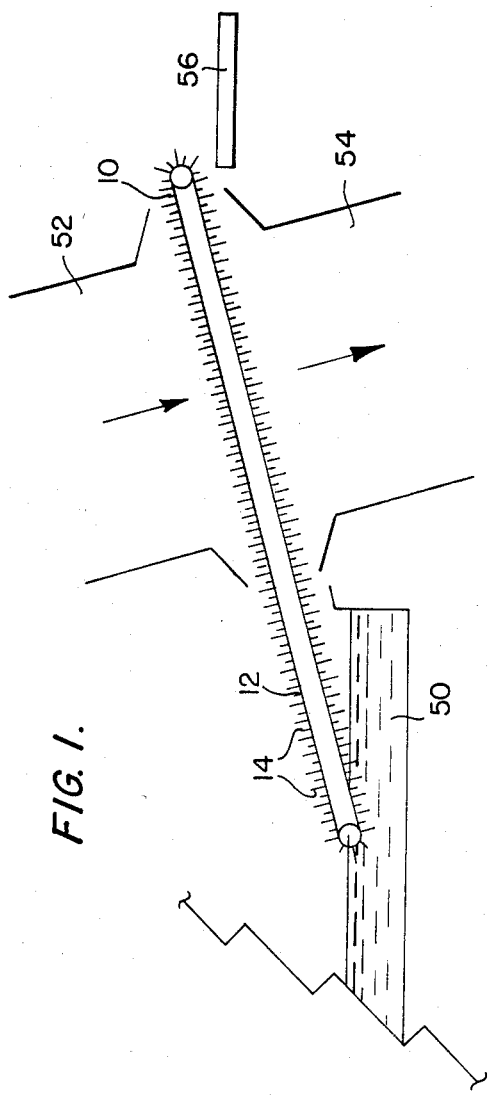
FIG. 1 is a schematic view of a conveyor in accordance with the invention, showing its intended use of removing disc-shaped articles from a liquid bath while maintaining the plane of the articles vertically.
Figure 4:
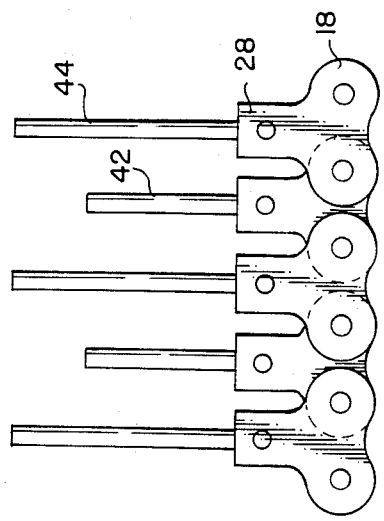
FIG. 4 is a side section view of a portion of the conveyor.

As shown in FIG. 1, the conveyor includes an endless conveyor 10 having a porous surface 12. The surface 12 of conveyor 10 includes means for orienting the articles vertically, the means comprising a plurality of rods 14 extending from the surface 12 in a generally perpendicular orientation with the surface 12.

Figure 2:
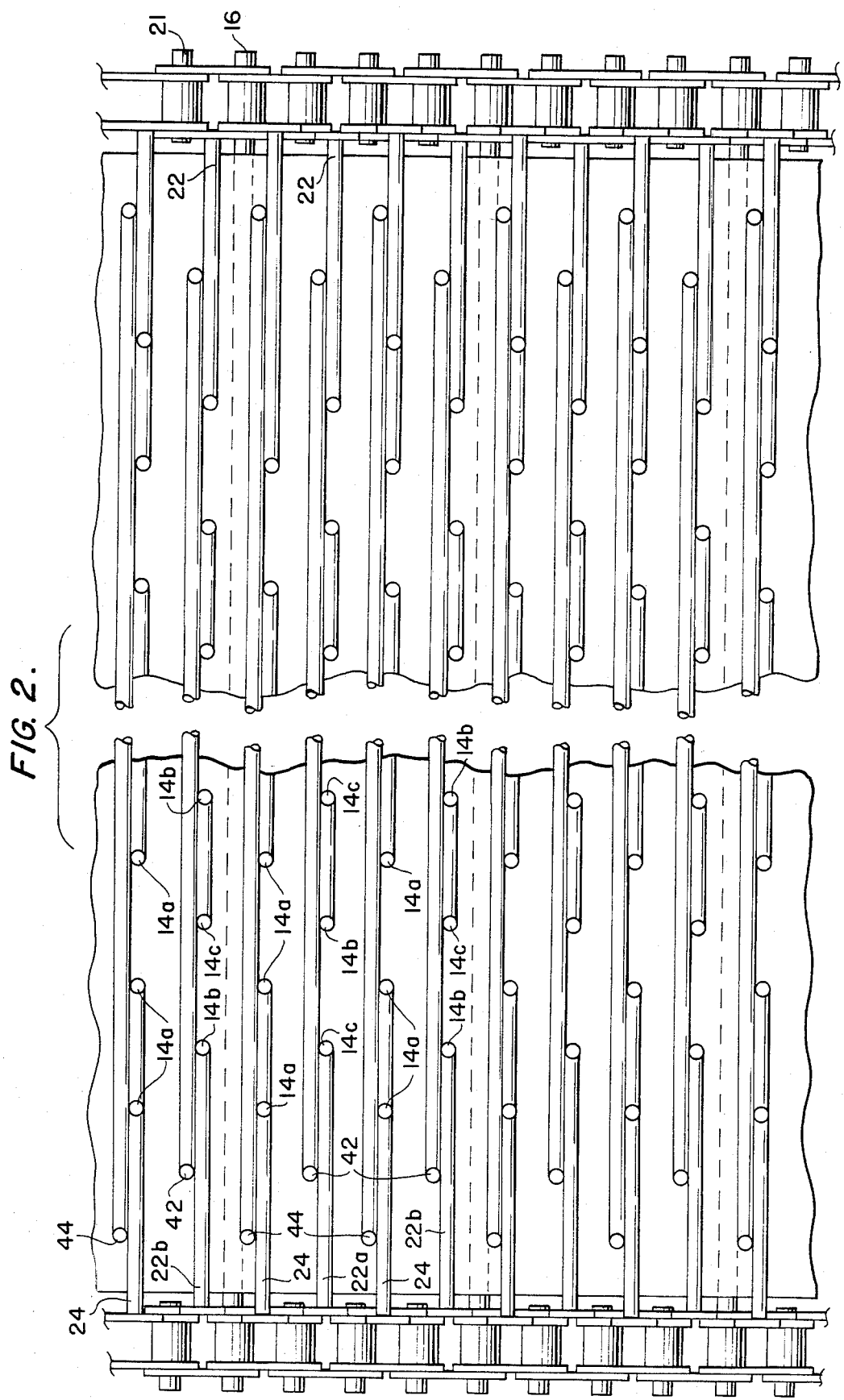
FIG. 2 is a top plan view of the conveyor of this invention with the center portion broken away.

The rods 14 are arranged in a generally symmetrical pattern which substantially covers the surface 12 of conveyor 10, see FIG. 2. Rods 14 which are nearest adjacent to each other, i.e., in closest proximity, are separated by a distance less than an average diameter of the disc-shaped articles. Such spacing between nearest adjacent rods 14 prevents the disc-shaped articles from settling horizontally between the rods 14 on the surface 12 of belt 10. The distance between nearest adjacent rods 14 is preferably within the range of from about 25% to about 35% of the average diameter of the disc-shaped articles.

The rods 14 ar of at least two different lengths, and nearest adjacent rods are generally of different lengths. A conveyor with rods 14 of a single length will not remove a substantial number of articles from a liquid with a vertical orientation. It has, however, been discovered that an arrangement of rods 14 in a pattern on the surface 12 of conveyor 10, wherein nearest adjacent rods 14 are of different lengths, causes the bulk of the articles to tip and fall on edge between the rods 14 upon removal of the articles from the liquid.

With a conveyor according to the invention having rods 14 of two different lengths, e.g., long rods 14a and short rods 14b, the short rods 14b are generally in closest proximity only to long rods 14a and long rods 14a are generally in closest proximity only to short rods 14b. The length of the long rods 14a is preferably within the range of from about 75% to about 150% of the average diameter of the disc-shaped articles, most preferably about 80% of said average diameter, and the long rods 14a and short rods 14b preferably have a length differential within the range of from about 60% to about 65%.

In a particularly preferred embodiment, the rods 14 are of three different lengths, long rods 14a, short rods 14b and intermediate length rods 14c. Nearest adjacent rods 14 are preferably of different lengths, and most preferably, short rods 14b are generally nearest adjacent only to long rods 14a, intermediate length rods 14c are generally nearest adjacent only to long rods 14a, and long rods 14a are generally nearest adjacent only to short rods 14b and intermediate length rods 14c, see FIG. 2.

The long rods 14a preferably have a length which is within the range of from about 75% to 150% of the average diameter of the disc-shaped articles, most preferably about 80% of said average diameter. The long rods 14a and the short rods 14b preferably have a length differential within the range of from about 60% to about 65%, and the intermediate length rods 14c have a length within the range of from about 110% of the length of the short rods 14b to about 90% of the length of the long rods 14a. The intermediate length rods 14c preferably have a length which is about twice that of the short rods 14b.

The conveyor belt 10 and rods 14 may be constructed of any suitable material capable of supporting the disc-shaped articles and withstanding the environmental rigors to which the conveyor will be subjected. When the invention is utilized to remove fried potato chips from frying oil and orienting the chips vertically, the conveyor is preferably constructed of a durable material capable of withstanding the high temperatures of frying oil, e.g., stainless steel.

A preferred conveyor embodying the invention is illustrated in FIGS. 2 through 7. The conveyor includes an endless conveyor 10 having surface 12. The conveyor 10 is preferably constructed of a durable, porous material, e.g., stainless steel mesh. The conveyor 10 is supported by a plurality of transverse support members 16 extending linearly through the belt 10. The transverse support members 16 extend through and connect any suitable number of chain links 18a and 18b of the chain drive means 19 located on each side 20 and 20' of the conveyor belt 10. Pins 21 interconnect the remaining chain links 18 not connected by transverse support member 16.

The surface 12 of conveyor 10 includes generally transverse rows 22 extending substantially linearly across the surface 12 of conveyor belt 10. Each of the transverse rows 22 include alternating short and intermediate length rods 14b and 14c. The alternating short and intermediate length rods 14b and 14c are substantially equally spaced along each of the transverse rows 22. The transverse rows 22 alternate with rows 24 of long rods 14a. The rows 24 of long rods 14a are generally parallel with transverse rows 22. The long rods 14a are spaced substantially the same along each of rows 24, as are the alternating short and intermediate length rods 14b and 14c along each of said transverse rows 22.

The long rods 14a of rows 24 are preferably substantially in phase with each other along the length of conveyor belt 10, i.e. rods 14a are in generally linear parallel alignment along the length of conveyor 10. The long rods 14a of rows 24 are preferably about 90° out of phase, along the length of conveyor 10, with the short and intermediate length rods 14b and 14c of transverse rows 22. The rods of nearest adjacent rows 22a and 22b of alternating short and intermediate length rods 14b and 14c are generally about 180° out of phase with each other, i.e., short and intermediate length rods 14b and 14c generally alternate with each other along the length of conveyor 10 to form rows in generally linear parallel alignment, see FIG. 2.

The rows 22 and 24 are preferably fixedly attached to the outer surface 12 of conveyor 10, e.g., by welding. The rows 22 and 24 are preferably supported in a perpendicular orientation relative to the surface 12 of conveyor belt 10 by support arms 26. A support arm 26 is fixedly attached (e.g., by welding) to one or more rods 14 at each end of each of rows 22 and 24 above the surface 12 of conveyor belt 10. The support arms 26 are connected to extensions 28 on the chain links 18.

Figure 5:
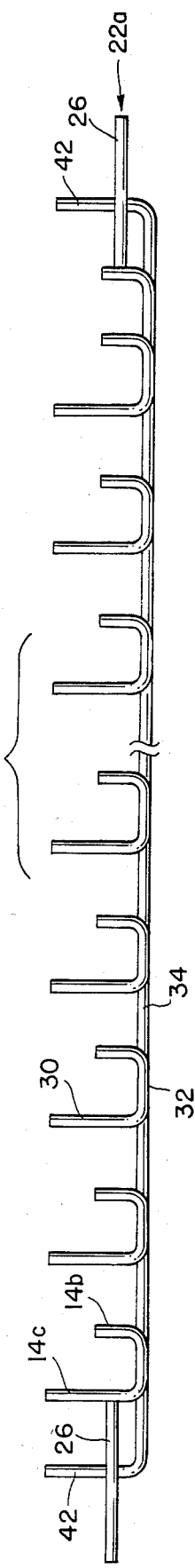
FIG. 5 is a front elevation view of a front row of rods of the conveyor with the center portion broken away.
Figure 6:
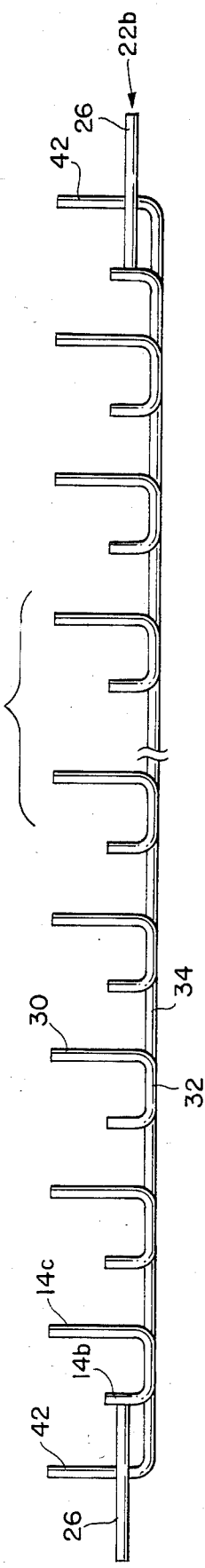
FIG. 6 is a front elevation view of a second rod of rods of the conveyor.
Figure 7:
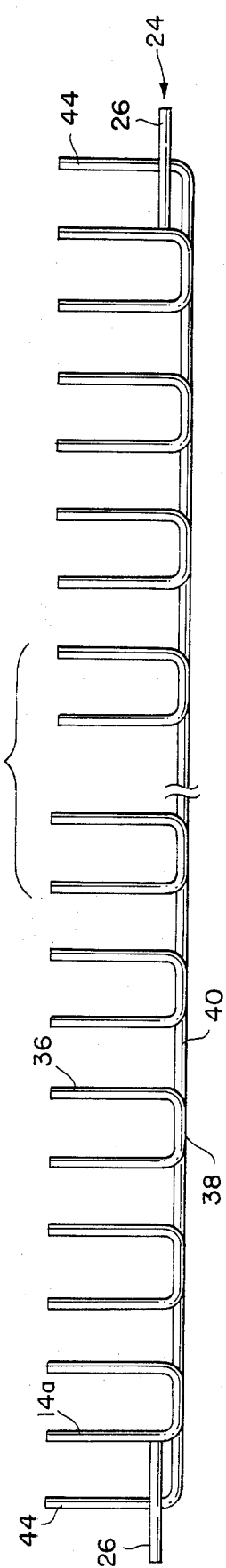
FIG. 7 is a vertical section view of a third row of rods of the conveyor.

As shown in FIGS. 5 and 6, the transverse rows 22a and 22b of alternating short and intermediate length rods 14b and 14c may be constructed of generally "J" shaped members 30 welded along their bases 32 to transverse bar 34. Similarly, rows 24 of long rods 14a may be constructed of generally "U" shaped members 36 welded along their bases 38 to bar 40.

In order to reduce the incidence of articles falling over the sides 20 and 20' of conveyor 10 during removal and conveyance of the articles, end rods 42 of rows 22a and 22b are preferably intermediate length rods 14c. End rods 44 of rows 24 are preferably long rods 14a. The end rods 42 and 44 alternate along the length of conveyor belt 10 about 90° out of phase, see FIG. 2.

Figure 8:
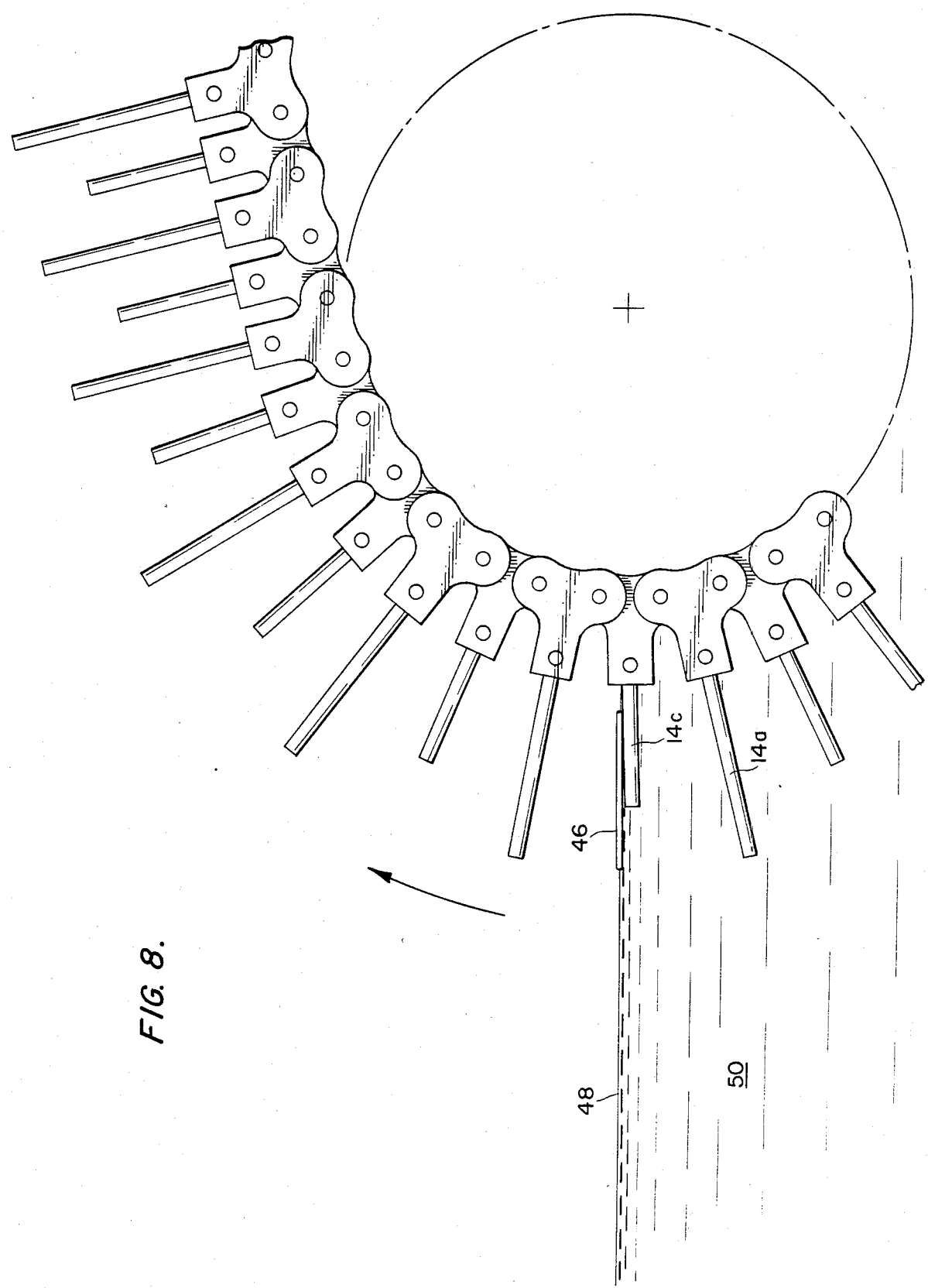
FIG. 8 is a side elevation view of a portion of the conveyor partially submerged in cooking oil and about to remove a potato chip from the oil.

When the conveyor of the present invention is used to remove fried potato chips from drying oil and orient the chips vertically, the conveyor is partially submerged in the cooking oil 50 and exits the cooking oil at an angle, see FIG. 1. It is preferred that the conveyor belt 10 be oriented in the cooking oil such that potato chips floating on the surface of the cooking oil are contacted by the rods 14 at an angle of about 0° relative to the planar surfaces of the chips, i.e., with the planar surfaces of the chips substantially parallel with the rods. FIG. 8 illustrates an intermediate length rod 14c about to contact a potato chip 46 floating on the surface of cooking oil 50 just prior to removal and vertical orientation of the chip. It has been found that removal and vertical orientation of the chips is facilitated when the rods 14 are substantially parallel with the chips when contacting the chips at the surface of the oil.

Removal of fried potato chips from frying oil with vertical orientation facilitates drainage of the oil from the slices. It has een found that a generally vertical orientation of the chips as they are removed from the frying oil reduces the oil content of the potato chips by up to about 5 percentage points or more due to drainage alone. It is particularly advantageous to utilize the invention with a post-fry blowoff system as described in commonly owned copending U.S. Patent Application Ser. No. 558,360, filed Dec. 5, 1983. When such a system is used, oil is blown off the vertically oriented chips by a blast of hot air from a blower through duct 52, and oil is drawn away from the chips by suction from below through duct 54. The chips are then deposited onto a conventional conveyor 56 for further processing as is known in the art.

The invention is further illustrated by the following example, which is not intended to be limiting.

EXAMPLE

Kennebec potatoes were washed, peeled and sliced at 0.074 inch thickness. The slices were spray washed by water jets for about 1 second before entering the fryer. The potato slices were fried in hot cottonseed oil at a temperature of about 300° F. for 4 minutes 10 seconds with a 20° F. temperature drop. The potato chips were removed from the oil at about 10% moisture content by a spiked porous conveyor system, as illustrated in the Figures, which maintained the chips in a maximum vertical orientation. The chips were then immediately subjected to a blast of hot air at a temperature of about 300° F. for 3 minutes 30 seconds, suction being applied from below the chips to remove the hot air and oil. The potato chips were tumbled with salt and packaged after being cooled. The chips had an average oil content of 22.8% by weight and an average moisture content of 2.08% by weight.

The conveyor of the present invention can be used as a takeout conveyor for potato chips without post-fry blowoff of oil, or can be used as a takeout conveyor for other products which have some stability, such as apple slices and the like.

Since many modifications, variations and changes in detail may be made to the described embodiment, it is intended that all matter in the foregoing description and shown in the accompanying drawings be interpreted as illustrative and not in a limiting sense.

What is claimed is:

1. An automatic product orienting elongated endless conveyor having one end extending into a body of liquid for automatically removing generally disc-shaped food articles from the body of liquid and automatically orienting the articles with the plane of the faces of the articles generally vertically, but not necessarily parallel from article to article so that liquid may drain by gravity from the food articles, said conveyor comprising an endless conveyor having a drainable surface, said surface including means for automatically orienting the articles vertically, said automatic orienting means comprising a plurality of rods extending from said surface in a generally perpendicular orientation with said surface, wherein the rods are of at least two different lengths, said rods being arranged in a generally symmetrical pattern in which the nearest adjacent rods are separated by a distance less than the average diameter of the articles and the nearest adjacent rods are generally of different lengths to thereby cause the articles to fall on their edges between the rods with the planes of the faces of the articles generally vertical, said rods comprising short rods and long rods, said long rods having a length which is within the range of about 75% to 150% of the average diameter of the articles, and the long rods and the short rods having a length differential within the range from about 60% to 65%.

2. The conveyor of claim 1 wherein the distance between nearest adjacent rods is within the range of from about 25% to about 35% of said average diameter.

3. The conveyor of claim 1 wherein the long rods have a length which is about 80% of said average diameter.

4. A conveyor for removing generally disc-shaped articles from a liquid and orienting the articles with the plane of the articles generally vertical, said conveyor comprising an endless conveyor having a surface, said surface including means for orienting the articles vertically, said means comprising a plurality of rods extending from said surface in a generally perpendicular orientation with said surface, wherein said rods are of three different lengths, nearest adjacent rods are separated by a distance less than the average diameter of the articles and nearest adjacent rods are generally of different lengths, the rods comprising short rods, intermediate length rods and long rods; wherein the long rods have a length which is within the range of from about 75% to about 150% of said average diameter, the long rods and the short rods have a length differential within the range of from abot 60% to about 65%, and the intermediate length rods have a length which is within the rage of from about 110% of the length of the short rods to about 90% of the length of the long rods.

5. The conveyor of claim 4 wherein short rods are nearest adjacent to long rods, intermediate length rods are nearest adjacent to long rods, and long rods are nearest adjacent to short and intermediate length rods.

6. The conveyor of claim 5 wherein said intermediate length rods have a length which is about twice that of said short rods.

7. The conveyor of claim 6 wherein the distance between nearest adjacent rods is within the range of from about 25% to about 35% of said average diameter.

8. The conveyor of claim 7 wherein the long rods have a length which is about 80% of said average diameter.

9. The conveyor of claim 8 comprising generally transverse rows on said belt, said transverse rows comprising alternating short and intermediate length rods, the alternating rods being generally equally spaced along each of said transverse rows; said transverse rows alternating with rows of long rods generally parallel to said transverse rows, the long rods having generally the same spacing along each of said rows of long rods as said alternating rods along each of said transverse rows, said rows of long rods being generally in phase with each other and about 90° out-of-phase with said transverse rows; and wherein nearest adjacent rows of alternating short and intermediate length rods are generally about 180° out-of-phase with each other.

10. A conveyor for removing fried potato chips from frying oil and orienting said potato chips generally vertically, said conveyor comprising; an endless conveyor belt having a surface, said surface including a plurality of rods of three different lengths extending from said surface in a generally perpendicular orientation with said surface, the three different length rods comprising short, intermediate length and long rods; wherein nearest adjacent rods are separated by a distance less than an average diameter of said potato chips, the short rods and the long rods have a length differential within the range of from about 60% to about 65%, the long rods have a length which is within the range of from about 75% to about 150% of the average diameter of said potato chips, and the intermediate length rods have a length which is about twice that of the short rods; and wherein short rods are nearest adjacent to long rods, intermediate length rods are nearest adjacent to long rods, and long rods are nearest adjacent to short and intermediate length rods.

11. The conveyor of claim 10 wherein nearest adjacent rods are separated by a distance which is within the range of from about 25% to about 35% of the average diameter of the potato chips.

12. The conveyor of claim 11 wherein the length of the long rods is about 80% of the average diameter of the potato chips.

13. The conveyor of claim 12 comprising generally transverse rows on said belt of alternating short and intermediate length rods, the alternating rods being generally equally spaced along each of said transverse rows; said transverse rows alternating with rows of long rods generally parallel to said transverse rows, the long rods having generally the same spacing along each of said rows of long rods as said alternating rods along each of said transverse rows, said rows of long rods being generally in phase with each other and about 90° out-of-phase with said transverse rows; and wherein nearest adjacent rows of alternating short and intermediate length rods are about 180° out-of-phase with each other.

14. The conveyor of claim 12 wherein said conveyor is oriented in said frying oil such that said rods contact said fried potato chips at said oil's surface with the rods substantially parallel with the planar surfaces of the chips.

15. The conveyor of claim 13 wherein said conveyor is oriented in said frying oil such that said rods contact said fried potato chips at said oil's surface with the rods substantially parallel with the planar surfaces of said chips.

* * * * *

UNITED STATES PATENT AND TRADEMARK OFFICE
CERTIFICATE OF CORRECTION

PATENT NO. : 4,563,944

DATED : January 14, 1986

INVENTOR(S) : Warren L. Tate

It is certified that error appears in the above-identified patent and that said Letters Patent is hereby corrected as shown below:

```
Column 5, Claim 4, line 59, delete "rage" and
substitute therefor -- range --.
```

Signed and Sealed this

Thirteenth Day of May 1986

[SEAL]

Attest:

DONALD J. QUIGG

Attesting Officer

Commissioner of Patents and Trademarks